Dec. 30, 1969  SUSUMU UBUKATA ET AL  3,487,358
FLASHING-LIGHT INDICATION SYSTEM FOR VEHICLES
Filed March 24, 1967  3 Sheets-Sheet 1

United States Patent Office 3,487,358
Patented Dec. 30, 1969

3,487,358
FLASHING-LIGHT INDICATION SYSTEM
FOR VEHICLES
Susumu Ubukata, Nagoya-shi, Yasukazu Mizutani, Kariya-shi, and Shozo Iyoda, Nagoya-shi, Japan, assignors to Susumu Ubukata, Nagoya-shi, Aichi-ken, Japan
Filed Mar. 24, 1967, Ser. No. 626,661
Claims priority, application Japan, Dec. 28, 1966,
41/551, 41/552, 41/553
Int. Cl. B60q 1/52, 1/34
U.S. Cl. 340—81
5 Claims

ABSTRACT OF THE DISCLOSURE

At least four indicating lamps are caused to flash for both turn direction indication and emergency parking (or hazard warning) indication by intermittent current passed by a time-delay relay activated by an auxiliary relay which, in turn, is operated by current passed by the time-delay relay, selection between the two kinds of indication and between left-turn and right-turn indication being made by switches. Several examples of circuit compositions and arrangements for this purpose are illustrated.

---

This invention relates to flashing-light and occulting-light indicating or signaling systems. More particularly, the invention relates to a new and improved flashing-light system for causing flashing-light indicating lamps of vehicles such as motor vehicles and like machines to accomplish flashing-light or blinker operation in accordance with a mode of indication appropriate for each of a number of various purposes such as turn direction indication and emergency parking indication.

Heretofore, the standard practice for indicating turn direction by flashing lights in vehicles has been to provide one group of front and rear indicating lamps for left turns and one group of front and rear indicating lamps for right turns and to cause either group of lamps to flash or blink, depending on the intended direction of turn, by means of an indication system.

Such an indication system is designed to have a characteristic whereby the state of flashing becomes abnormal when a front or rear indicating lamp becomes inoperative because of a defect such as a break in its circuit, this abnormal flashing state being readily detectable by the driver of the vehicle. Accordingly, the defect causing the abnormal flashing state can be promptly traced and corrected. This characteristic of the turn direction indication system is herein called "one-lamp circuit-break detection."

There has recently been an increasing need for the emergency flashing of all left-turn and right-turn indicating lamps, including at least the basic flashing lamps installed at the front and rear of a vehicle, in cases when the vehicle is to be stopped or parked on a roadway because of unavoidable circumstances such as a breakdown or accident. This flashing-light indication is hereafter referred to simply as "parking indication."

A necessary requirement for such parking indication may be considered to be that of reliable flashing operation even in the case of a minimum of a single lamp since it is possible for the number of operable flashing indicating lamps to be reduced in number because of occurrences such as collisions. This characteristic of the parking indication system is herein called "minimum operation."

It is an object of the present invention to provide a flashing-light indication system for vehicles for accomplishing both turn direction indication and parking indication, which system has versatile characteristics, including the one-lamp circuit-break detection characteristics in turn direction indication operation and, in parking indication operation, the minimum operative characteristics of accomplishing flashing operation even with a minimum of one lamp and, of course, with all lamps (some recent vehicles being provided with auxiliary indicating lamps on the sides and two additional rear lamps, i.e., a total of eight lamps).

Another object of the invention is to provide an indication system of the above stated character which has a relatively simple composition and arrangement having low-cost and economical features.

According to the present invention, briefly summarized, there is provided a flashing-light indication system for vehicles characterized by its capability of accomplishing both turn direction indication and parking indication and by the combination of a plurality of indicating lamps, a time-delay relay having a normally closed switch element driven by an actuating component, an auxiliary relay having a normally open contact operated by an activating part in response to a current flowing to the indicating lamps, the switch element, the actuating component, and at least the contact of the auxiliary relay being connected in series to a power source, whereby intermittent current can be passed by the time-delay relay, and switches, all being connected in a manner as to cause the intermittent current to flow to respective indicating lamps selectively for turn direction indication and for parking indication.

The nature, principle, and details of the invention, as well as the utility thereof, will be more clearly apparent from the following detailed description with respect to preferred embodiments of the invention, when read in conjunction with the accompanying drawings, in which like parts are designated by like reference numerals and characters. In the drawing.

Figure 1:
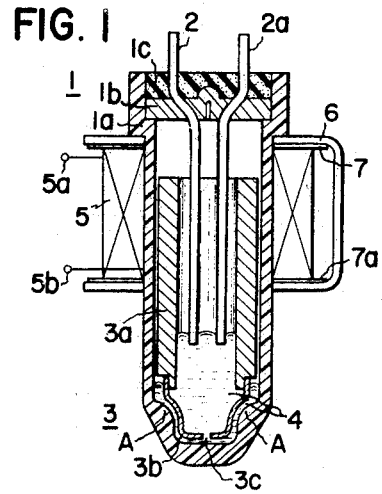
FIGS. 1 and 2 are elevational views in vertical section, showing an example of a time-delay relay of the mercury type suitable for use in an indication system according to the invention and respectively indicating two states of operation.
Figure 2:
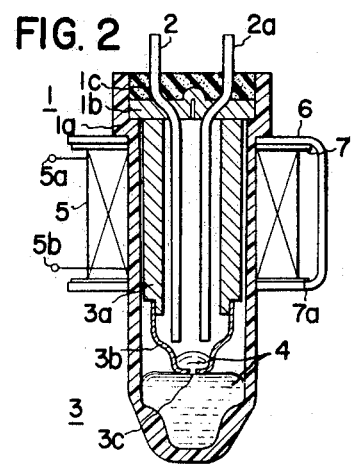
Figure 3:
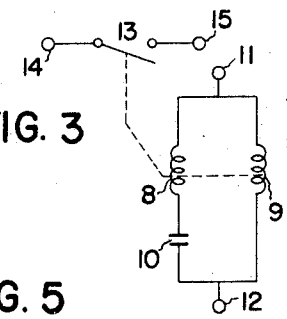
FIGS. 3 and 4 are schematic diagrams respectively showing other examples of time-delay relays suitable for use in the indication system of the invention.
Figure 4:
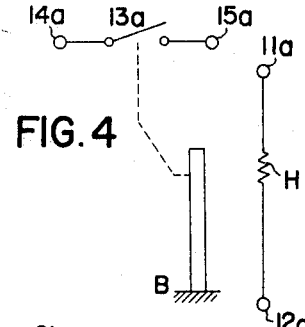

Examples of flasher devices suitable for use in the system according to the present invention to accomplish flashing operation are: a time-delay relay in which the fluid motions of mercury are utilized as illustrated in FIGS. 1 and 2; a time-delay relay in which the charging and discharging of a capacitor are utilized as indicated in FIG. 3; and a time-delay relay in which the thermo-mechanical behaviour of a bimetal element is utilized as indicated in FIG. 4.

Irrespective of the type of device, the essential requirement for a flasher device suitable for the system of the invention is that utilization be made of a delayed-action, delayed-return relay capable of accomplishing automatic flashing operation wherein, the circuit opening and closing switch element is normally in the closed state and is maintained in the closed state for a short delay period (for example, approximately 0.3 second) after the actuating component such as a magnetic coil or heater for driving the switch element is energized, the switch element thereafter opening, and wherein the open state of the switch element is maintained for a short delay period (for example, approximately 0.3 second) after the actuating component is deenergized and thereafter closes again.

Referring to FIGS. 1 and 2, the principal structural part of the time-delay relay illustrated therein is a sealed vessel 1 comprising a cylindrical structure 1a with a closed bottom end and an open upper end, a cover plate 1b fitted into the open end of the cylindrical structure 1a and fixedly supporting a pair of electrodes 2 and 2a passed therethrough, and a sealing compound 1c for sealing and bonding the cover plate 1b to the cylindrical structure 1a.

Within the sealed vessel 1, there are contained a quantity of mercury 4 and a movable element 3 capable of moving up and down within the cylindrical structure 1a. The movable element 3 consists of an upper, thick-wall cylindrical part 3a made of a ferromagnetic material and a thin-wall cup 3b fitted on and fixed to the lower end of the cylindrical part 3a. The cup 3b is provided at its bottom with a small orifice 3c for restricted flow therethrough of mercury.

The upper outer part of the cylindrical structure 1a is encompassed by an electromagnet coil 5 having power supply terminals 5a and 5b and a yoke 6 made of a material such as iron for establishing an outer magnetic path for magnetic flux. The yoke 6 and the coil 5 are insulated from each other by guards 7 and 7a.

FIG. 1 shows the time-delay relay in its deenergized state, wherein the movable element 3 is in the lowest position with a shoulder part of the cup 3b in contact with protrusions A at the bottom of the vessel 1. When the relay is in this state, the electrodes 2 and 2a are shorted in closed state by the mercury 4.

When a voltage is applied to the terminals 5a and 5b, the resulting magnetic force produced by the magnet coil 5 lifts the movable element 3, and the mercury within the movable element is also raised together therewith, whereby the lower ends of the electrodes 2 and 2a are temporarily inserted to a still greater depth into this mercury. Thereafter, this mercury flows downward gradually through the orifice 3c and separates from the lower tips of the electrodes 2 and 2a. The state of the relay at this time is shown in FIG. 2.

When, with the relay in this state, the electromagnet coil 5 is deenergized, the movable element 3 descends, taking in mercury through its orifice 3c, until it returns to the aforementioned lowest position, that is, the state indicated in FIG. 1.

It is obvious, therefore, that by short-circuiting the power supply terminal 5a of the electromagnet coil 5 and the electrode 2 and applying a power source to a series circuit of the power supply terminal 5b and the electrode 2a, the time-delay relay can be caused to undergo automatically repetitions of the above described on-off operation.

Referring to FIG. 3, the essential elements of the example illustrated therein of a time-delay relay of the type in which the charging and discharging of a capacitor is utilized are schematically represented by electrical symbols. Electromagnet coils 8 and 9 are wound with respect to the same magnet core (not shown) in a manner such that they respectively produce magnetic forces of mutually opposite directions when a power source is applied across power supply terminals 11 and 12.

A capacitor 10 is connected in between the coil 8 and the power supply terminal 12. A circuit opening and closing element (or switch element) 13 provided with terminals 14 and 15 is adapted to be actuated by the electromagnetic forces of the electromagnet coils 8 and 9 and to be closed when the coils 8 and 9 are not energized.

When an appropriate relationship is selected and established between the electrical characteristics of the electromagnet coils 8 and 9 and the capacitor 10, and a power source (not shown) is applied between the power supply terminals 11 and 12, a charging current toward the capacitor 10 flows for a short time through the coil 8. For this reason, the combined magnetic force of the magnetic forces of the coils 8 and 9 is small, and the switch element 13 continues to be in a closed-circuit state similar to that at the time of no energization. However, as the charging of the capacitor 10 progresses, the electromagnetic force produced by the coil 8 decreases until, finally, the difference between this electromagnetic force and that produced by coil 9 imparts an actuating force exceeding a predetermined value to the switch element 13, which thereupon is opened.

Then, if the power source is cut off from the power supply terminals 11 and 12, the charge stored in the capacitor 10 is discharged through the electromagnet coils 8 and 9, whereby the switch element 13 continues for a while to maintain its open state and again closes at the time when the discharge current is attenuated.

It is obvious, therefore, that by short-circuiting terminals 15 and 11 and applying a power source to a series circuit of terminals 14 and 12, the above described on-off operation can be caused to be automatically repeated.

FIG. 4 illustrates an example of a time-delay relay in which the thermo-mechanical behaviour of a bimetal element is utilized. In this diagram the essential elements of the relay are schematically represented by electrical symbols. A heater H having power supply terminals 11a and 12a is disposed to heat a bimetal element B adapted to actuate a switch element 13a which has terminals 14a and 15a and is normally closed.

When a power source (not shown) is applied to the power supply terminals 11a and 12a, the heater H produces heat, by which the bimetal element B is heated. As the supplying of power is continued, the temperature of the bimetal element B gradually rises. Accordingly, the bimetal element B progressively deflects, and at a suitable position thereof (or after a suitable time interval), the switch element 13a is opened.

If the power supplied to the heater H is cut off simultaneously with the opening of the switch element 13a, the temperature of the heater H will begin to fall, but since it will be higher than the temperature of the bimetal element B for a certain time period, the temperature of the bimetal element B will continue to rise, even if the power supply is cut off, and then will begin to fall after a time period. Consequently, the bimetal element B will then deflect toward the direction of the original position before application of power to the heater H. As a result, the switch element 13a will continue for a certain time period to be in its open state and will then be closed.

It will be aparent, therefore, that by short-circuiting the terminals 11a and 15a and applying a power source to a series circuit of terminals 14a and 12a, the above described on-off operation of the switch element 13a can be caused to be automatically repeated.

Thus, the terminals 5a and 5b of the electromagnet coil of a mercury time-delay relay correspond to the power supply terminals 11 and 12 in a time-delay relay of the capacitor charge-discharge type and to the power supply terminals 11a and 12a in a bimetal time-delay relay. Furthermore, the terminals or electrodes 2 and 2a of the switch element in a mercury time-delay relay, the terminals 14 and 15 of the capacitor type relay, and the terminals 14a and 15a of a bimetal type relay have a similar relationship.

While the above described three devices are examples of time-delay relays respectively having switch elements which are normally closed, time-delay relays depending on other operating principles may be employed in the system of the invention as described below, provided that they are similar in function to the above described three examples and make possible the fulfillment of the aforementioned requirement for a flasher device suitable for the system of the invention.

Furthermore, while the following detailed description covers applications of the invention with respect to the above three examples, since the two examples illustrated in FIGS. 3 and 4 can be considered to be identical in functional effect, the following description is set forth with respect to the single example shown in FIG. 3 as being representative in order to avoid duplication, In order to accomplish satisfactorily turn direction indication and parking indication as described at the beginning of this disclosure through the use of a time-delay relay as described above, it is necessary that the indication system have characteristics and capabilities over a wide range including those of one-lamp circuit-break detection and minimum operation. Accomplishing this operation by means of a device which passes current for the indicating lamps directly through the time-delay relay, however, necessitates a fine adjustment such as to sacrifice, unavoidably, the performance of obtaining time delay, whereby there arises the inconveniences such as an increase in the number of circuits in the wiring to the vehicle and the necessity of providing overcurrent capacity as described hereinafter. Accordingly, in order to overcome these difficulties, the additional use of a separate auxiliary relay affords more economical and reliable operation.

Figure 5:
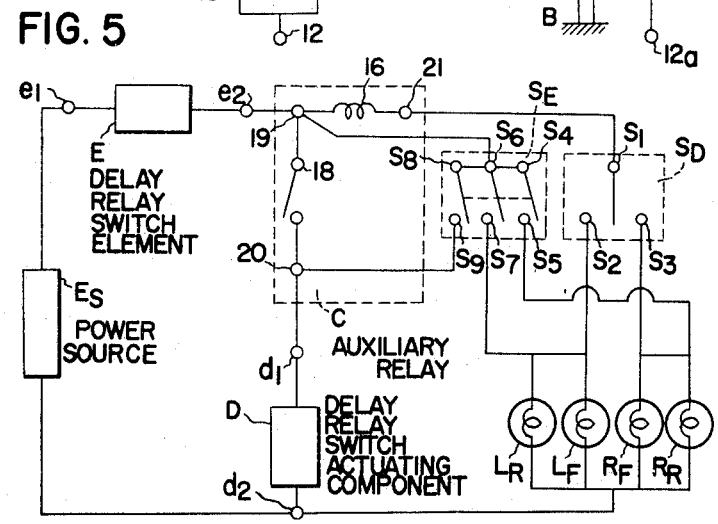
FIGS. 5 through 9 are circuit diagrams respectively showing examples of indication systems embodying the invention.

FIG. 5 is a circuit diagram indicating the composition and connection arrangement of one example of a system embodying the invention, which system is represented schematically by electrical symbols for the purposes of description of the features of the invention. In FIG. 5, the portion C enclosed by dotted line is a miniature relay of high magnetic efficiency used as one example of an auxiliary relay and accomplishes a simple operation wherein a contact 18 closes upon being activated by an electromagnet coil 16 constituting an activating part and is open in the inactivated state.

The block designated by reference character D represents the component for actuating the switch element of a time-delay relay as described hereinbefore and corresponds to the electromagnet coil 5 of the relay shown in FIG. 1 and to the combination of the magnet core (not shown), magnet coils 8 and 9, and capacitor 10 of the capacitor relay illustrated in FIG. 3. The component D has power supply terminals $d_1$ and $d_2$ corresponding to the power supply terminals $5a$ and $5b$ and terminals 11 and 12 of the above mentioned examples. The component D actuates a switch element E of the time-delay relay, which element E is normally in the closed state as described hereinbefore and has terminals $e_1$ and $e_2$ corresponding to terminals 2 and $2a$ and terminals 14 and 15 of the above mentioned examples.

The system is supplied with power from a power source $E_s$, which is ordinarily a storage battery (or accumulator), to cause appropriate flashing of a left rear lamp LR, a left front lamp LF, a right front lamp RF, and a right rear lamp RR of a vehicle, the flashing operation being accomplished by the above described time-delay relay operating in cooperation with the auxiliary relay C and operational switches SE and SD described below.

The operational switch SD is for turn direction indication and has a movable contact $S_1$ and stationary contacts $S_2$ and $S_3$. These contacts are so connected that when the movable contact $S_1$ is in contact with stationary contact $S_2$, one group of the left-hand indicating lamps LF and LR is supplied with intermittent indication current, and when the movable contact $S_1$ and contact $S_3$ are in closed state, a group of the right-hand indicating lamps RF and RR are supplied with the indication current.

The operational switch SE is for parking indication and has interconnected or ganged movable contacts $S_4$, $S_6$, and $S_8$ for contacting stationary contacts $S_5$, $S_7$, and $S_9$, respectively, whereby there are provided three ganged switches $S_4$–$S_5$, $S_6$–$S_7$, and $S_8$–$S_9$. When these three switches are closed, all indicating lamps are supplied with intermittent indication current, and when these switches are open, all indicating lamps are not supplied with the indication current.

The auxiliary relay C is so set that when the combined current for either the right-hand or left-hand group of indicating lamps of the vehicle flows through the electromagnet coil 16, this coil 16 activates the contact 18, and if one of the indicating lamps in that one group is not being lit because of a break, the resulting current cannot cause activation of the contact 18.

Accordingly, when the operational switch SD for turn direction indication in the system of the composition and circuit arrangement as indicated in FIG. 5 is placed in the right-turn or left-turn position, a circuit with respect to the power source $E_s$ is formed through the switch element E, electromagnet coil 16, operational switch contacts $S_1$ and $S_3$ or $S_2$, and right-turn indicating lamps RF and RR or left-turn indicating lamps LF and LR. Simultaneously, the electromagnetic force of the electromagnet coil 16 activates the contact 18, whereby a circuit through the switch element E, contact 18, and actuating component D is also introduced in parallel with respect to the power source $E_s$.

Since the actuating component D opens the switch element E after a predetermined time delay, the above mentioned two circuits are then cut off from the power source $E_s$, whereby the indicating lamps which have been lit are extinguished, and the electromagnet coil 16 is also deenergized, whereby the contact 18 is opened. Then, since the deenergization of the actuating component D causes its switch element E to return to its original (closed) state after a time delay, the above described operation is automatically continued as long as the operational switch SD is placed in the turn direction indication state.

When, instead of the operational switch SD for turn direction indication, the operational switch SE for parking indication is operated and placed in its indicating state, the power supply path from the power source $E_s$ to all indicating lamps is formed through the closed contacts $S_4$ and $S_5$ and closed contacts $S_6$ and $S_7$, and, since the parking indication switch $S_8$, $S_9$ connected in parallel with the contact of the auxiliary relay is also closed, the switch element E operates to interrupt intermittently the flow of current through this path, whereby all indicating lamps are caused to flash.

Since the set condition of the auxiliary relay C is as described hereinbefore, one-lamp circuit-break detection is attained when the operational switch SD for turn direction indication is operated. Furthermore, when the operational switch SE for parking indication is switched on, the switch contacts $S_8$ and $S_9$ are closed. Accordingly, flashing is carried out irrespective of the number of indicating lamps, whereby the aforestated object can be achieved.

Figure 6:
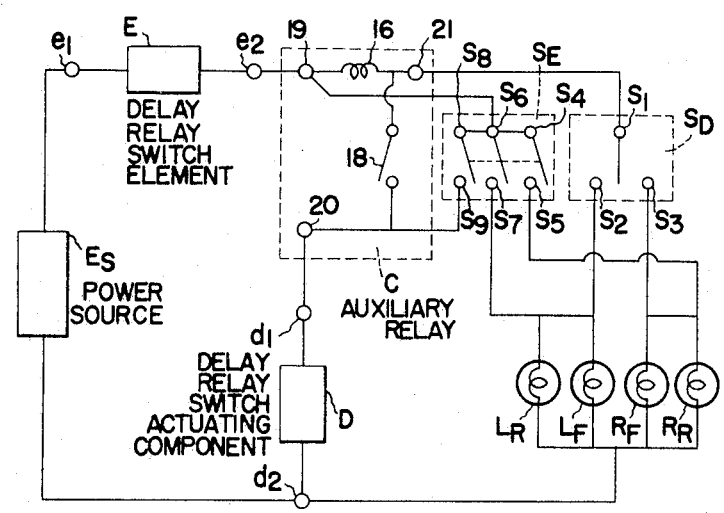

Another embodiment of the invention is illustrated in FIG. 6, in which parts which are similar to those in the example shown in FIG. 5 are designated by the same reference numerals and characters. The example of the invention shown in FIG. 6 is fundamentally the same as the system illustrated in FIG. 5, the only difference being in the mode of connection of the contact 18 of the auxiliary relay C.

In this emodiment, when the operational switch SD for turn direction indication is placed in an indication state, the sum of the current which flows to a pair of the indicating lamps and the current which flows to the actuating component of the time-delay relay flows to the electromagnetic coil 16 of the auxiliary relay. Consequently, the current with which the electromagnetic coil 16 actuates the contact 18 corresponds to said sum of said currents, and it is necessary to determine said sum current so that the contcat 18 may not be actuated by the current at the time when one of the lamps of a pair cannot pass its current therethrough due to breaking of filament of said one lamp. Except for this problem, the operation of this embodiment is just the same as that in the embodiment of FIG. 5. Therefore, the explanation is not repeated here.

Figure 7:
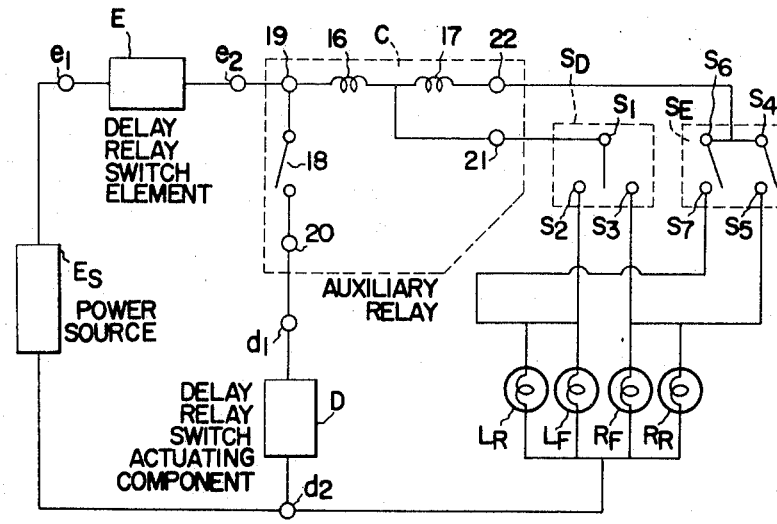

Next, as another example of embodiment of the invention, a system having an auxiliary relay which differs in composition from those described above and has two coils constituting an activating part of the auxiliary relay will now be described with reference to FIG. 7. In FIG. 7, the portion C enclosed by intermittent line is an electromagnetic relay similar in function to the auxiliary relays shown in FIGS. 5 and 6 and has two electromagnet coils 16 and 17, a contact 18, terminals 19 and 20 for connection respectively to a time-delay relay switch element E and its actuating component D, and terminals 21 and 22 for connection respectively to a switch SD for turn direction indication and a switch SE for parking indication.

The auxiliary relay C of the above described composition and connections as illustrated in FIG. 7 operates in the following manner. The auxiliary relay C is so set that the electromagnet coil 16 activates the contact 18 when the total current of either of the vehicle right-turn and left-turn groups of indicating lamps flows through the coil 16 and cannot be caused to activate the contact 18 by the current which flows therethrough when there is a break in the circuit of one of the indicating lamps of the group.

The electromagnet coil 17 imparts an electromagnetic force which is additive to that of the coil 16 to the contact 18. The relay is so set that the contact 18 can be closed when the current for one of the indicating lamps flows through these two coils 16 and 17. It is necessary that this auxiliary relay have an over-current capacity such that, even when the total current for all indicating lamps flows through the electromagnet coils 16 and 17, the temperature rise will not exceed a specified value.

Then, when the switch SD for turn direction indication is operated in the system of the above described composition and connection arrangement as shown in FIG. 7, the same operation as that of the examples described hereinbefore with reference to FIGS. 5 and 6 is accomplished. When the parking indication switch SE is placed in the indicating position, all indicating lamps of the vehicle are connected to receive intermittent power from the switch element E through the electromagnet coils 16 and 17 and thereby produce flashing light.

Since the set condition of the auxiliary relay C is as described hereinabove, flashing operation is accomplished in a fully satisfactory manner even with only a single indicating lamp when the parking indication switch SE is closed.

Figure 8:
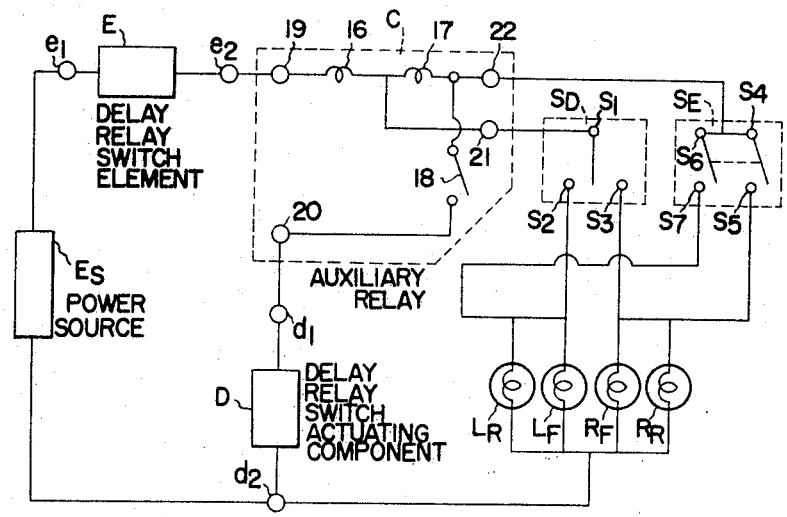
Figure 9:
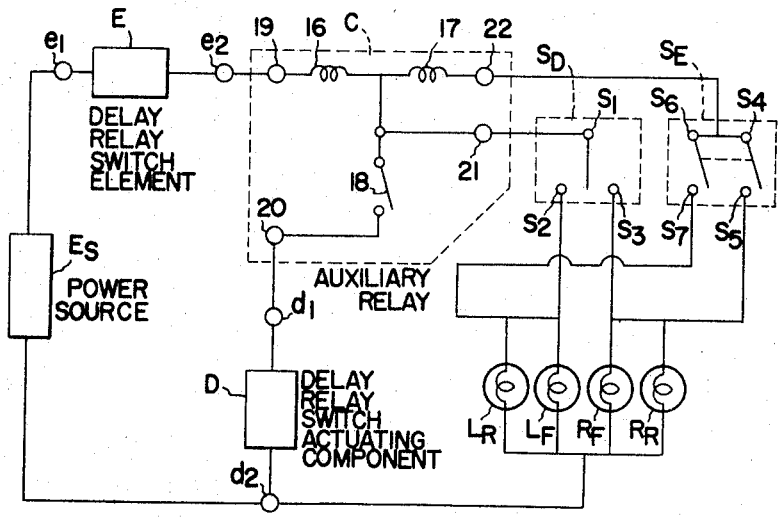

Further examples of embodiment of the present invention as illustrated in FIGS. 8 and 9 are examples of applications of the system shown in FIG. 7. The electromagnet coils constituting an activating part of auxiliary relay C in these examples are in part or in entirety connected in series with the component D for actuating the switch element E of the time-delay relay and, fundamentally, are the same as those in the system illustrated in FIG. 7. The operations of the systems shown in FIGS. 8 and 9 can also be readily inferred from the example illustrated in FIG. 7, the description thereof, therefore, will herein be omitted.

A feature of the systems illustrated in FIGS. 7, 8, and 9 is that the number of contacts required for the parking indication switch in each case is two, whereby simplification in arrangement such as circuit organization in comparison with that of the systems shown in FIGS. 5 and 6 is afforded.

While only the case wherein an electromagnetic relay is used as an auxiliary relay has been described in each of the above described examples, the auxiliary relay need not be limited particularly to electromagnetic types, it being also possible to utilize devices depending on other methods. One example of an alternative device is a thermal relay. A thermal relay can be incorporated in each of the above described examples by making the following changes in the compositional elements of the auxiliary relay C.

The compositional material 18 which constitutes a contact is replaced by a contact device in which a bimetal element, upon being heated by a heater, deflects and short-circuits its contact points. The electromagnet coils 16 and 17 are replaced by heaters to constitute activating parts for activating the contact device, the heaters operating, when a predetermined current is passed therethrough, to heat the bimetal element and cause it to deflect to close the contact.

A thermal relay, by its nature, possesses a slow responsive characteristic. For this reason, when an intermittent current for the indicating lamps flows through the heaters which are the activating parts, the thermal relay can be caused to continue to maintain its contact in the closed state. Accordingly, when a relay having a slow responsive characteristic as in the case of a thermal relay is used as an auxiliary relay, the contact thereof continues to be in the closed state in spite of the interruption operation of the time-delay switch element E which is used for the purpose of interrupting the current for the indicating lamps.

This means that the number of cycles of the contact making and breaking operation of the auxiliary relay is small, and a thermal relay is more advantageous than an electromagnetic relay in durability. While a thermal relay is subject to changes in its characteristics due to the effect of the temperature of the surrounding atmosphere, it can readily be provided with a suitable temperature compensation mechanism for overcoming this difficulty.

In the examples illustrated in FIGS. 7, 8, and 9, the activating elements 16 and 17 are connected in series and are so arranged that they are caused to close a contact by passing a current for the parking indication lamps through both of these activating parts. This arrangement is advantageous in the case of the activating part being the electromagnet coils of an electromagnetic relay. In the case of a thermal relay, however, this is not necessarily the only feasible arrangement method, it being possible to adopt another method.

More specifically, it is possible to use the activating parts 16 and 17 separately, that is, for example, to assign specialized functions thereto by using the heater 16 for turn direction indication and the heater 17 for parking indication. Since the circuit arrangement in this case can be readily inferred from FIGS. 7, 8, and 9, a circuit diagram thereof is herein omitted.

As described above in detail with respect to specific examples, the present invention affords, through the use of a single indication system, both turn direction indication and parking indication as flashing-light type indications for vehicles, which system, moreover, by the provision therein of an auxiliary relay in addition to time-delay relay for governing the flashing-light indication, fully satisfies the different conditions respectively for turn direction indication and parking indication.

The function of the contact of the auxiliary relay is merely to supply an extremely low current such as an exciting current to the actuating component of the switch element of the time-delay relay, and a relay of very low capacity, therefore, is sufficient. Accordingly, another advantageous feature of the present invention is that the system according thereto can be produced much more economically than a system wherein the circuit for actuating the switch element for a large current such as that for indicating lamps is caused to have overcurrent capacity.

What we claim is:

1. A flashing-light indication system for a vehicle comprising in combination, a power source; a direction indicating operational switch; a right-hand group of direction indicating lamps on the right side of the vehicle and a left-hand group of direction indicating lamps on the left side of the vehicle, one terminal of each of said lamps being connected to said power source; a time-delay relay including a normally closed contact of delay-action and delay-return type and a contact actuating member for actuating said normally closed contact, one terminal of said normally closed contact being connected to said power source; an auxiliary relay including a normally opened contact which is closed in response to existence of a normal current passing through a group of direction indicating lamps and a contact actuating member for actuating said contact, one terminal of said actuating member and one terminal of said contact being connected to another terminal of said normally closed contact of said time-delay relay, another terminal of said contact actuating member of said auxiliary relay being connected to other terminals of said group indicating lamps through said direction indicating operational switch, and said contact of said auxiliary relay being connected so as to energize or deenergize said contact actuating member of said time-delay relay; a parking indicating operational switch including contacts connected to said other terminals of said groups of direction indicating lamps and a cooperative contact which is connected so as to by-pass said normally opened contact of said auxiliary relay, and a common contact of said operational switch being connected to the terminal of the normally closed contact of the said time-delay relay, said terminal being opposite to the terminal connected to said power source.

2. A flashing-light indication system for a vehicle comprising, in combination, a power source; a direction indicating operational switch; a right-hand group of direction indicating lamps on the right side of the vehicle and a left-hand group of direction indication lamps on the left side of the vehicle, one terminal of each of said lamps being connected to said power source; a time-delay relay including a normally closed contact of delay-action and delay-return type and a contact actuating member for actuating said normally closed contact, one terminal of said normally closed contact being connected to said power source; an auxiliary relay including a normally opened contact which is closed in response to existence of a normal current passing through a group of said direction indicating lamps and a contact actuating member for actuating said contact, one terminal of said actuating member being connected to another terminal of said normally closed contact of said time-delay relay and another terminal of said actuating member being connected to other terminals of said groups of direction indicating lamps through said direction indicating operational switch and said contact of said auxiliary relay being connected so as to energize or deenergize said contact actauting member of said time-delay relay from another terminal side of said actuating member of said auxiliary relay; a parking indicating operational switch including contacts connected to said other terminals of said direction indicating lamps and a cooperative contact which is connected so as to by-pass said normally opened contact of said auxiliary relay, and a common contact of said operational switch being connected to the terminal of the normally closed contact of said time-delay relay, said terminal being opposite to the terminal connected to said power source.

3. A flashing-light indication system for a vehicle comprising, in combination, a power source; a direction indicating operational switch; a parking indicating operational switch; a right-hand group of indicating lamps on the right side of the vehicle and a left-hand group of indicating lamps on the left side of the vehicle, one terminal of each of said lamps being connected to said power source; a time-delay relay including a normally closed contact of delay-action and delay-return type and a contact actuating member for actuating said contact, one terminal of said normally closed contact being connected to said power source; an auxiliary relay including a normally opened contact and an actuating member for actuating said contact, common terminal side of said contact actuating member being connected to another terminal of said normally closed contact of said time-delay relay, said actuating member of said auxiliary relay having a first terminal adapted to close said normally opened contact by means of the normal current passing through a group of direction indicating lamps and a second terminal adapted to close said normally opened contact by means of the current passing through only one lamp of said group of indicating lamps, said first terminal being connected to other terminals of said group indicating lamps through said direction indicating operational switch, said second terminal being connected to said other terminals of said group indicating lamps through said parking indicating operational switch, and the series circuit comprising said normally opened contact of said auxiliary relay and said contact actuating member of said time-delay relay being inserted and connected between one terminal of said power source and another terminal of said normally closed contact of said time-delay relay.

4. A flashing-light indication system for a vehicle comprising, in combination, a power source; a direction indicating operational switch; a parking indicating operational switch; a right-hand group of indicating lamps on the right side of the vehicle and a left-hand group of indicating lamps on the left side of the vehicle, one terminal of each of said lamps being connected to said power source; a time-delay relay including a normally closed contact of delay-action and delay-return type and a contact actuating member for actuating said contact, one terminal of said normally closed contact being connected to said power source; an auxiliary relay including a normally opened contact and an actuating member for actuating said contact, common terminal side of said contact actuating member being connected to another terminal of said normally closed contact of said time-delay relay, said contact actuating member of said relay having a first terminal adapted to close said normally opened contact by means of a normal current passing through a group of direction indicating lamps and a second terminal adapted to close said normally opened contact by means of the curren passing through only one lamp of said group indicating lamps, said first terminal being connected to other terminals of said group indicating lamps through said direction indicating operational switch, said second terminal being connected to said other terminals of said group indicating lamps through said parking indicating operational switch, and the series circuit comprising said normally opened contact of said auxiliary relay and said contact actuating member of said time-delay relay being inserted and connected between one terminal of said power source and said first terminal of said actuating member of said auxiliary relay.

5. A flashing-light indication system for a vehicle comprising, in combination, a power source; a direction indicating operational switch; a parking indicating operational switch; a right-hand group of indicating lamps on the right side of the vehicle and a left-hand group of indicating lamps on the left side of the vehicle, one terminal of each of said lamps being connected to said power source; a time-delay relay including normally closed contact of delay-action and delay-return type and a contact actuating member for actuating said contact, one terminal of said normally closed contact being connected to said power source; an auxiliary relay including a normally opened contact and an actuating member for actuating said contact, common terminal side of said contact actuating member being connected to another terminal of said normally closed contact of said time-delay relay, said contact actuating member of said relay having a first terminal adapted to close said normally opened contact by means of a normal current passing through a group of direction indicating lamps and a second terminal adapted to close said normally opened contact by means of the current passing through only one lamp of said group indicating lamps, said first terminal being connected to other terminals of said group indicating lamps through said direction indicating operational switch, said second terminal being connected to said other terminals of said group indicating lamps through said parking indicating operational switch, and the series circuit comprising said normally opened contact of said auxiliary relay and said contact actuating member of said time-delay relay being inserted and connected between one terminal of said power source and said second terminal of said actuating member of said auxiliary relay.

References Cited

UNITED STATES PATENTS

| | | | |
|---|---|---|---|
| 2,623,935 | 12/1952 | Young | 340—80 X |
| 2,803,811 | 8/1957 | Turney | 340—80 |
| 3,142,736 | 7/1964 | Mitchell | 335—52 |
| 3,308,427 | 3/1967 | Hess | 340—80 X |
| 3,325,784 | 6/1967 | Erdelitsch et al. | 340—81 X |
| 3,333,149 | 7/1967 | Siiberg | 340—80 X |
| 3,377,445 | 4/1968 | Ubukata et al. | 335—52 X |

FOREIGN PATENTS

| | | |
|---|---|---|
| 782,273 | 9/1957 | Great Britain. |
| 831,510 | 3/1960 | Great Britain. |
| 916,724 | 1/1963 | Great Britain. |

JOHN W. CALDWELL, Primary Examiner

KENNETH N. LEIMER, Assistant Examiner

U.S. Cl. X.R.

335—51; 340—251